(12) United States Patent
Arntzen et al.

(10) Patent No.: US 7,809,899 B2
(45) Date of Patent: Oct. 5, 2010

(54) SYSTEM FOR INTEGRITY PROTECTION FOR STANDARD 2N-BIT MULTIPLE SIZED MEMORY DEVICES

(75) Inventors: Eskild T Arntzen, Cheyenne, WY (US); Jackson L. Ellis, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 664 days.

(21) Appl. No.: 11/754,532

(22) Filed: May 29, 2007

(65) Prior Publication Data
US 2008/0301403 A1 Dec. 4, 2008

(51) Int. Cl.
*G06F 13/00* (2006.01)
*G06F 13/28* (2006.01)
*G06F 11/00* (2006.01)
*G11C 29/00* (2006.01)

(52) U.S. Cl. .............. 711/154; 711/150; 711/E12.103; 714/763; 714/5

(58) Field of Classification Search ............ 711/150, 711/154, E12.103; 714/763
See application file for complete search history.

(56) References Cited

U.S. PATENT DOCUMENTS

| 6,279,072 B1 * | 8/2001 | Williams et al. ............ 711/105 |
| 2007/0186040 A1 * | 8/2007 | Kasahara et al. ............ 711/115 |
| 2009/0164712 A1 * | 6/2009 | Tanaka et al. ................ 711/103 |

* cited by examiner

*Primary Examiner*—Matt Kim
*Assistant Examiner*—Edward J Dudek, Jr.
(74) *Attorney, Agent, or Firm*—Christopher P. Maiorana, PC (57) ABSTRACT

An apparatus including a first circuit and a second circuit. The first circuit may be configured to generate one or more command signals, a read data path control signal and one or more write data path control signals in response to an integrity protection control signal and one or more arbitration signals. The second circuit may be configured to write data to a memory and read data from the memory in response to the one or more command signals, the read data path control signal and the one or more write data path control signals. In a first mode, the data may be written and read without integrity protection. In a second mode the data may be written and read with integrity protection, and the integrity protection is written and read separately from the data.

20 Claims, 7 Drawing Sheets

SYSTEM FOR INTEGRITY PROTECTION FOR STANDARD 2N-BIT MULTIPLE SIZED MEMORY DEVICES

FIELD OF THE INVENTION

The present invention relates to error detection/correction generally and, more particularly, to a system for integrity protection for standard 2n-bit multiple sized memory devices.

BACKGROUND OF THE INVENTION

Typically, an Error Correcting Code (ECC) is implemented within a channel itself and not on a shared basis. Because the ECC is not implemented on a shared basis, replication of code occurs between devices that use some form of an ECC. Each channel builds a correct data/ECC block before sending the block to the memory controller to be stored. Building the correct data/ECC block prior to sending the block to the memory controller typically requires each device to have large internal memories in order to store all the data/ECC to be written to, or read with correction from, the external memory. As a result, the design decision is often made to not include ECC on some channels where the cost/benefit trade-off is less.

Another existing technique implements a memory that is wider than the data width so that the ECC bits are stored as part of a data word. The wider memory solution is often implemented as a shared solution available to all channels accessing the memory device. The wider memory technique has a disadvantage of increased cost, both in terms of money and physical space.

It would be desirable to have a solution to protect the data in a standard memory device that is only as wide as the data. In addition, it would be desirable to have a solution that may be shared between multiple channels accessing the memory device. It would be further desirable to have a solution that may be utilized by each channel using the memory device without making any significant changes to the channels.

SUMMARY OF THE INVENTION

The present invention concerns an apparatus including a first circuit and a second circuit. The first circuit may be configured to generate one or more command signals, a read data path control signal and one or more write data path control signals in response to an integrity protection control signal and one or more arbitration signals. The second circuit may be configured to write data to a memory and read data from the memory in response to the one or more command signals, the read data path control signal and the one or more write data path control signals. In a first mode, the data may be written and read without integrity protection. In a second mode the data may be written and read with integrity protection, and the integrity protection may be written and read separately from the data.

The objects, features and advantages of the present invention include providing a system for integrity protection for standard 2n-bit multiple sized memory devices that may (i) provide error checking, (ii) provide error correction capability, (iii) provide an error protection scheme, possibly with correction capability, (iv) be used with any memory that is a multiple of 2n bits, (v) provide an interface for dynamically enabling and disabling the integrity protection, (vi) be seamlessly integrated into a memory controller, (vii) provide a data reassembly unit for read data, (viii) provide a data and data protection assembly unit for write data, (ix) provide bit-based data protection using memories that are multiples of 2n bits, (x) allow all channels to access data protection when using an external memory, (xi) support standard multiples of 2n bit external memories, (xii) add little cost, (xiii) hide complexity of using data protection from the channels, (xiv) provide a shared resource that allows for lower cost and smaller size, (xv) allow for "end-to-end" data protection, (xvi) allow a requester to change data even during assertion of a write data acknowledgment signal and/or (xvii) be available on a "need" basis.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
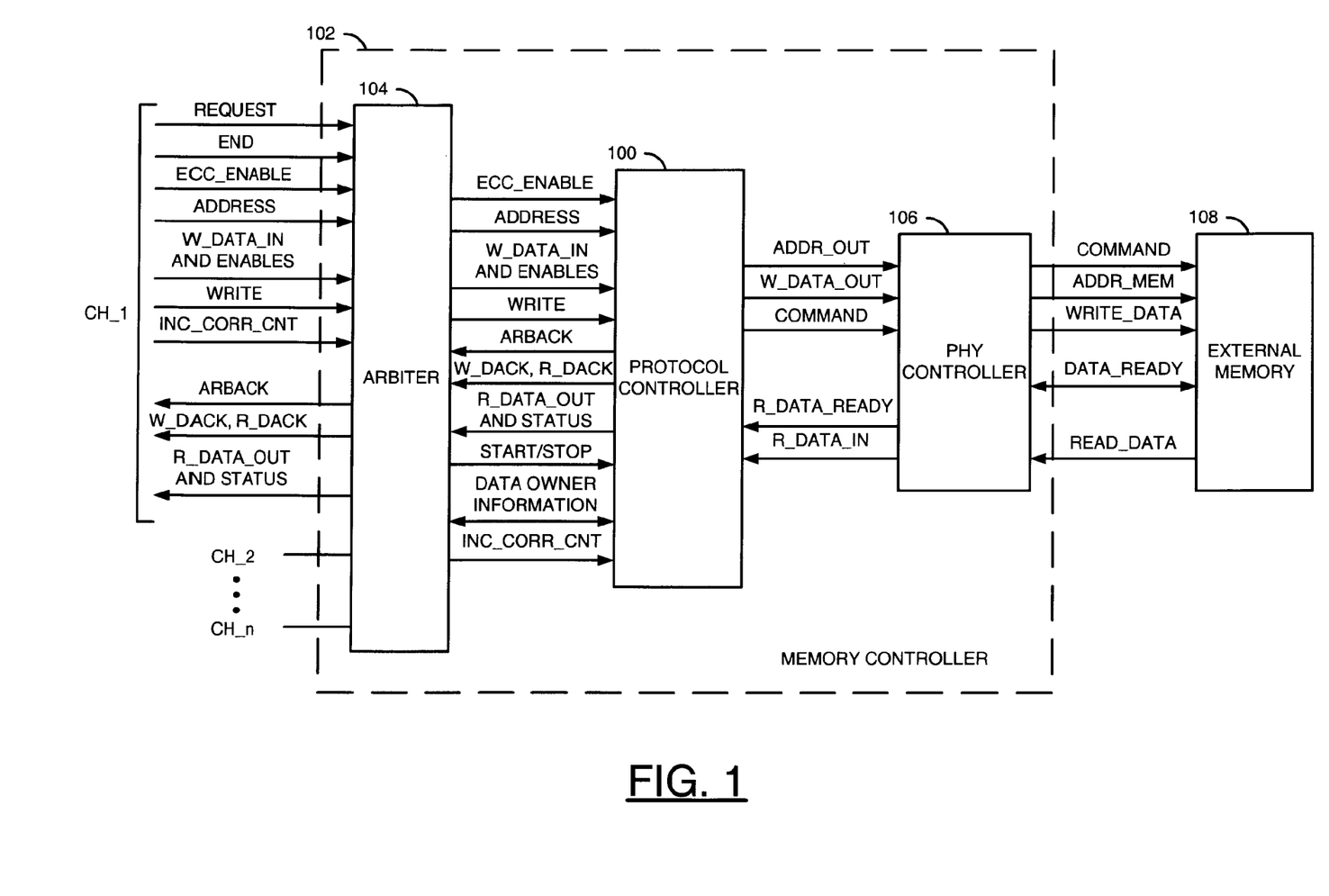
FIG. 1 is a block diagram illustrating a memory controller in accordance with a preferred embodiment of the present invention.

Referring to FIG. 1, a block diagram is shown illustrating a protocol controller 100 implemented in accordance with a preferred embodiment of the present invention. The protocol controller 100 is shown implemented in the context of a memory controller 102. The protocol controller 100 may have a first interface and a second interface. In one example, the first interface of the protocol controller 100 may be configured to couple the protocol controller 100 to an arbiter 104. The second interface of the protocol controller 100 may be configured to couple the protocol controller 100 to a physical layer (PHY) controller 106.

The first interface may have a first input that may receive a signal (e.g., ECC_ENABLE), a second input that may receive a signal (e.g., ADDRESS), a third input that may receive a signal (e.g., W_DATA_IN) and a number of enable signals (e.g., ENABLES), a fourth input that may receive a signal (e.g., WRITE), a fifth input that may receive a signal (e.g., START/STOP) and a sixth input that may receive a signal (e.g., INC_CORR_CNT). The first interface of the protocol controller 100 may also have a first output that may present a signal (e.g., ARBACK), a second output that may present a first signal (e.g., W_DACK) and a second signal (e.g. R_DACK), a third output that may present one or more signals (e.g., R_DATA_OUT and STATUS) and an input/output that may present or receive information regarding data ownership.

The signal W_DATA_IN may be implemented as an input write data signal. The signal ENABLES may comprise byte enables. In one example, each write byte may have an enable bit that may indicate whether the corresponding byte is to be written or not. The byte enables are generally implemented in accordance with a particular memory. In one example, for each byte input of a memory, corresponding enable (or mask) bit (or pin) may be implemented. The memory controller 100 may be configured to treat the signal ENABLES as write data to be passed along with the input write data to the memory being controlled.

The signals ARBACK, W_DACK, R_DACK, ECC_ENABLE, INC_CORR_CNT, START/STOP, STATUS and WRITE may be implemented, in one example, as control signals. The signals ARBACK may be implemented as an arbitration acknowledgment signal. The signal W_DACK may be implemented as a write data acknowledgment signal. The signal R_DACK may be implemented as a read data acknowledgment signal. The signal ECC_ENABLE may be implemented as an integrity protection control signal.

The second interface of the protocol controller 100 may have a first output that may present a signal (e.g., COMMAND), a second output that may present a signal (e.g., ADDR_OUT), a third output that may present a signal (e.g., W_DATA_OUT), a first input that may receive a signal (e.g., R_DATA_READY) and a second input that may receive a signal (e.g., R_DATA_IN). The second interface may be implemented as a conventional memory interface.

The arbiter 104 may be configured to arbitrate between a number (e.g., N) of channels to be granted access to the protocol controller 100. Each channel may be implemented similarly. In one example, a first interface of the arbiter 104 may have a number of inputs for each channel for receiving respective ones of the signals ECC_ENABLE, ADDRESS, W_DATA_IN, ENABLES, WRITE, INC_CORR_CNT and a request signal (e.g., REQUEST) and an end signal (e.g., END). The first interface of the arbiter 104 may also have a number of outputs for each channel for presenting respective ones of the signals ARBACK, W_DACK, R_DACK, R_DATA_OUT and STATUS.

The physical layer controller (PHY) 106 may be configured to communicate with the protocol controller 100 and a memory device 108. The PHY 106 may have a first interface configured to couple to the second interface of the protocol controller 100 and a second interface configured to communicate with the memory device 108. The memory device 108 may be implemented using a standard 2n-bit memory device.

The first interface of the PHY 106 may have a first input that may receive the signal ADDR_OUT, a second input that may receive the signal W_DATA_OUT, a third input that may receive the signal COMMAND, a first output the may present the signal R_DATA_READY and a second output that may present the signal R_DATA_IN. The second interface of the PHY 106 may have a first output that may present the signal COMMAND to a first input of the memory 108, a second output that may present a signal (e.g., ADDR_MEM) to a second input of the memory 108, a third output that may present a signal (e.g., WRITE_DATA) to a third input of the memory 108, an input/output that may exchange a handshake or status signal (e.g., DATA_READY) with an input/output of the memory 108 and an input that may receive a signal (e.g., READ_DATA) from an output of the memory 108.

In one example, the memory device 108 may be an external memory. The memory device 108 may be implemented, for example, as a synchronous dynamic random access memory (SDRAM). In one example, the memory device 108 may be implemented as a double data rate (DDR) SDRAM. However, other types of memory (e.g., DDR2, QDR, etc.) may be implemented accordingly to meet the design criteria of a particular implementation. The arbiter 104, the PHY 106 and the memory 108 may be implemented using conventional techniques.

The block 104 is generally configured to arbitrate between n channels seeking access to the external memory 108. A channel requests access to the memory 108 by asserting the signal REQUEST. In conjunction with the signal REQUEST, the requesting channel also provides other information through the other signals presented to the block 104. When the block 104 grants a channel access to the memory 108, the block 104 asserts the signal ARBACK for the channel being granted access. Data flow control for the channel having access to the memory 108 is handled by the signals W_DACK and R_DACK. The block 104 generally asserts the signal W_DACK when write data is accepted or asserts the signal R_DACK when read data is provided.

Once access has been granted to a channel, the block 104 passes all the information provided by the requester to the block 100. The block 100 is generally configured to control data and command flow. The block 100 is configured to provide the block 106 with appropriate command, address and data signals. The block 100 is also configured to accept read data from the block 106 and present the read data to the block 104 so that the read data may be transferred to the appropriate requesting channel. The block 106 is configured to ensure that the command, address and data provided by the block 100 is transmitted to the external memory 108 at an appropriate time and in an appropriate format. The block 106 may be further configured to processes read data presented by the external memory 108 and pass the read data on to the block 100 in the appropriate format.

Figure 2:
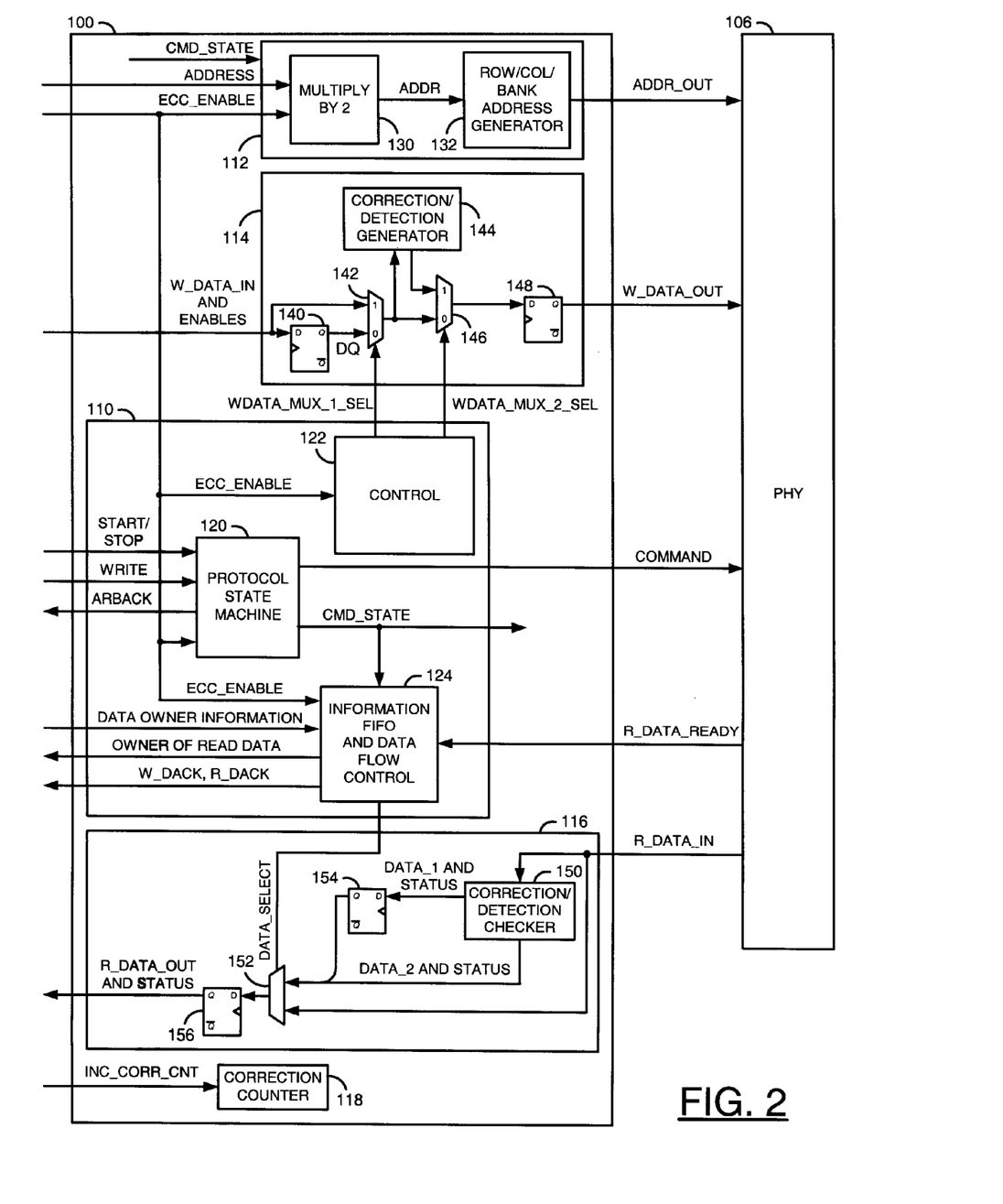
FIG. 2 is a block diagram illustrating a protocol controller in accordance with a preferred embodiment of the present invention.

Referring to FIG. 2, a block diagram is shown illustrating an example of the protocol controller 100 of FIG. 1 implemented in accordance with a preferred embodiment of the present invention. In one example, the protocol controller 100 may comprise a block 110, a block 112, a block 114, a block 116 and a block 118. In one example, the block 110 may be implemented as a first circuit and the blocks 112-118 may be implemented as a second circuit. The block 110 may be implemented as a control block (or circuit). The block 112 may be implemented as an address block (or circuit). The block 114 may be implemented as a write data path block (or circuit). The block 116 may be implemented as a read data path block (or circuit). The block 118 may be implemented as a correction counter block (or circuit). The block 118 may be optional. For example, when error detection tracking or statistics are not desired the block 118 may be omitted.

The block 110 may have a first input that may receive the signal START/STOP, a second input that may receive the signal WRITE, a third input that may receive the signal ECC_ENABLE, a fourth input that may receive data owner information and a fifth input that may receive the signal R_DATA_READY. The block 110 may also have a first output that may present the signal COMMAND, a second output that may present the signal ARBACK, a third output that may present the signals W_DACK and R_DACK, a fourth output that may present information about an owner of the read data, a fifth output that may present a signal (e.g., DATA_SELECT), a sixth output that may present a signal (e.g., WDATA_MUX_1_SEL), a seventh output that may present a signal (e g., WDATA_MUX_2_SEL) and an eighth output that may present a signal (e.g., CMD_STATE). The signal DATA_SELECT may be implemented as a read data path control signal. The signals WDATA_MUX_1_SEL and WDATA_MUX_2_SEL may be implemented as one or more write data path control signals. The block 110 may be configured to generate the signals ARBACK, COMMAND, W_DACK, R_DACK, DATA_SELECT, CMD_STATE, WDATA_MUX_1_SEL, and WDATA_MUX_2_SEL in response to the signals ECC_ENABLE, R_DATA_READY, START/STOP and WRITE.

The block 112 may have a first input that may receive the signal ADDRESS, a second input that may receive the signal ECC_ENABLE, a third input that may receive the signal CMD_STATE and an output that may present the signal ADDR_OUT. The block 112 may be configured to generate the signal ADDR_OUT in response to the signals ADDRESS, CMD_STATE and ECC_ENABLE. For example, the block 112 may be configured to generate the signal ADDR_OUT having (i) one address for each address in the signal ADDRESS when the signal ECC_ENABLE is in a first state (e.g., unasserted) and (ii) two addresses for each address in the signal ADDRESS when the signal ECC_ENABLE is it a second state (e.g., asserted).

The block 114 may have a first input that may receive the signals W_DATA_IN and ENABLES, a second input that may receive the signal WDATA_MUX_1_SEL, a third input that may receive the signal WDATA_MUX_2_SEL and an output that may present the signal W_DATA_OUT. In a first mode, the block 114 may be configured to generate the signal W_DATA_OUT comprising data corresponding to data received via the signal W_DATA_IN. In a second mode, the block 114 may be configured to generate the signal W_DATA_OUT comprising both data corresponding to the data received via the signal W_DATA_IN and integrity protection data (e.g., error correction code, parity, etc.). The block 114 may be further configured to switch between the first and the second modes in response to the signals WDATA_MUX_1_SEL and WDATA_MUX_2_SEL.

In general, the integrity protection data may be added in a manner that does not increase the size of the data bus. For example, for an 8-bit wide data bus the integrity protection data covering 8-bits of data may be presented directly after the 8-bits as illustrated in the following TABLE 1:

TABLE 1

| memory loc. 0 | memory loc. 1 | memory loc. 2 | memory loc. 3 |
|---|---|---|---|
| B0 | E0 | B1 | E1 | where B# represents a protected data byte and E# represents the integrity protection data byte (e.g., ECC, parity, etc.) for the protected data. For a 32-bit wide data bus, the integrity protection data for four bytes may be presented after the four bytes as illustrated in the following TABLE 2:

TABLE 2

| memory loc. 0 | memory loc. 1 | memory loc. 2 | memory loc. 3 |
|---|---|---|---|
| B3 B2 B1 B0 | E3 E2 E1 E0 | B7 B6 B5 B4 | E7 E6 E5 E4 |

The block 116 may have a first input that may receive the signal R_DATA_IN, a second input that may receive the signal DATA_SELECT, one or more outputs that may present the signals R_DATA_OUT and STATUS. In a first mode, the block 116 may be configured to generate the signal R_DATA_OUT in response to the signal R_DATA_IN. In a second mode, the block 116 may be configured to generate the signal R_DATA_OUT in response to data received via the signal R_DATA_IN after performing error detection and optionally error correction using integrity protection data (e.g., error correction code, parity, etc.) also received via the signal R_DATA_IN. The block 114 may be further configured to switch between the first and the second modes in response to the signal DATA_SELECT.

The block 118 may have an input that may receive the signal INC_CORR_CNT. The block 118 may be configured to track a number of times data error detections and/or corrections are reported. The block 118 may be omitted in applications where such tracking is not desired.

In one example, The block 110 may comprise a block 120, a block 122 and a block 124. The block 120 may be implemented as a protocol state machine. The block 122 may be implemented as a write data flow control block (or circuit). The block 124 may be implemented as an information first-in, first-out (FIFO) and read data flow control block (or circuit). In an alternative embodiment, the blocks 122 and 124 may be combined in one block (or circuit). The block 120 may have a first input that may receive the signal ECC_ENABLE, a second input that may receive the signal START/STOP and a third input that may receive the signal WRITE. The block 120 may also have a first output that may present the signal ARBACK, a second output that may present the signal COMMAND to the second interface and a third output that may present a signal (e.g., CMD_STATE) to a first input of the block 124 and an output of the block 110. The signal CMD_STATE is generally indicative of a state machine state of the block 120. The signal COMMAND is generally formatted in accordance with the memory device 108.

The block 122 may have an input that may receive the signal ECC_ENABLE, a first output that may present the signal WDATA_MUX_1_SEL and a second output that may present the signal WDATA_MUX_2_SEL. The block 122 may be configured to generate the signals WDATA_MUX_1_SEL and WDATA_MUX_2_SEL in response to the signal ECC_ENABLE.

The block 124 may have a first input that may receive the signal CMD_STATE, a second input that may receive the signal R_DATA_READY, a third input that may receive data owner information, a fourth input that may receive the signal ECC_ENABLE, a first output that may present the signals W_DACK and R)_DACK, a second output that may present the signal DATA_SELECT and a third output that may present information concerning an owner of the read data being presented via the signal R_DATA_OUT. The block 124 may be configured to generate the signals W_DACK and R_DACK and DATA_SELECT in response to the signals CMD_STATE, ECC_ENABLE and R_DATA_READY. The block 124 may be further configured to store data owner information received with a request for data (e.g., in a FIFO memory) and present the owner information with the data retrieved as part of the response to the request.

In one example, the block 112 may comprise a block 130 and a block 132. The block 130 may be implemented as an address multiplier block (or circuit). The block 132 may be implemented as a row, column, bank address generator block (or circuit). The block 130 may be configured to generate a signal (e.g., ADDR) in response to the signals ADDRESS and ECC_ENABLE. For example, the block 130 may be configured to (i) present the signal ADDRESS as the signal ADDR when the signal ECC_ENABLE is in a first state (e.g., unasserted) and (ii) present the signal ADDR comprising two sequential addresses starting at the address contained in the signal ADDRESS when the signal ECC_ENABLE is in a second state (e.g., asserted). The block 132 may be configured to generate the signal ADDR_OUT in response to the signals ADDR and CMD_STATE. The signal ADDR_OUT may comprise, in one example, row, column and bank address information for accessing the memory 108.

In one example, the block 114 may comprise a block 140, a block 142, a block 144, a block 146 and a block 148. The block 140 may be implemented as a register block (or circuit). In one example, the block 140 may be implemented as a D-type register. The block 142 may be implemented, in one example, as a multiplexer block (or circuit). The block 144 may be implemented, in one example, as an error correction/detection generator. The block 146 may be implemented, in one example, as a multiplexer block (or circuit). The block 148 may be implemented, in one example, as a register block (or circuit). In one example, the block 148 may be implemented as a D-type register.

The signals W_DATA_IN and ENABLES may be presented to an input of the block 140 and a first input of the block 142. An output of the block 140 may be presented to a second input of the block 142. A control input of the block 142 may receive the signal WDATA_MUX_1_SEL. An output of the block 142 may be presented to an input of the block 144 and a first input of the block 146. In one example, the block 142 may select (i) a first portion of the signals W_DATA_IN and ENABLES (e.g., DQO) for presentation to the block 144 when the signal WDATA_MUX_1_SEL is in a first state (e.g., a logic LOW, or "0") and (ii) a second portion of the signals W_DATA_W and ENABLES when the signal W_DATA_MUX_1_SEL is in a second state (e.g., a logic HIGH, or "1"). An output of the block 144 may be presented to a second input of the block 146. The block 146 may have a control input that may receive the signal WDATA_MUX_2_SEL. An output of the block 146 may be presented to an input of the block 148. In one example, the block 146 may select (i) the output of the block 142 for presentation to the input of the block 148 when the signal WDATA_MUX_2_SEL is in a first state (e.g., a logic LOW or "0") and (ii) the output of the block 144 for presentation to the input of the block 148 when the signal W_DATA_MUX_2_SEL is in a second state (e.g., a logic HIGH, or "1"). An output of the block 148 may present the signal W_DATA_OUT.

In one example, the block 116 may comprise a block 150, a block 152, a block 154 and a block 156. The block 150 may be implemented as an error correction/detection checker block (or circuit). The block 152 may be implemented as a multiplexer block (or circuit). The block 154 may be implemented as a register block (or circuit). In one example, the block 154 may be implemented as a D-type register. The block 156 may be implemented as a register block (or circuit). In one example, the block 156 may be implemented as a D-type register.

The signal R_DATA_IN may be presented to an input of the block 150 and a first input of the block 152. A first output of the block 150 may present signals (e.g., DATA_1 and STATUS) to an input of the block 154. A second output of the block 150 may present signals (e.g., DATA_2 and STATUS). An output of the block 154 may be combined (or merged) with the second output of the block 150 and presented to a second input of the block 152. The block 152 may have a control input that may receive the signal DATA_SELECT. An output of the block 152 may be presented to an input of the block 156. An output of the block 156 may present the signals R_DATA_OUT and STATUS.

The block 110 generally provides control logic for the block 100. The control logic may comprise a protocol state machine (e.g., the block 120), a write data control logic (e.g., the block 122) and a read data control logic (e.g., the block 124). The block 112 is generally configured to manage address modification when the present invention is enabled (e.g., the signal ECC_ENABLE is asserted). The block 114 is generally controlled by the block 122 to ensure that the appropriate write data is sent out at the appropriate time. The block 120 may be configured to generate command/control signals for the block 106 as well as the blocks 124 and 122. The block 124 may be configured to control read data verification/correction by the block 116 as well as generate the signal R_DACK indicating data is valid and provide data ownership information to go with the signal R_DACK. The block 116 generally processes the data coming from the block 106.

When error detection/correction is to be performed, the first data and correction detection information may be registered in the block 154 after being processed by the block 150. When the second data comes in, the result may be merged with the information stored in the block 154 and passed on to the block 104 along with the signal R_DACK and ownership information from block 124. When an error is detected and reported to the appropriate requester, the block 118 may be configured to increment a correction counter at the request of the active channel by assertion of the signal INC_CORR_CNT by the requestor on the active channel.

The present invention generally comprises an error detection and possibly correction code generator, an error detector and possibly corrector and data storage registers. In one example, the error detection and correction implemented comprises an Error Correcting Code (ECC). However, the invention is not limited to an ECC and may be used with any bit-based correction scheme. For example, The blocks 144 and 150 may be implemented as a parity generator and parity checker, respectively.

The present invention may further comprise an interface configured to enable and disable integrity protection dynamically, as well as report status information regarding the operation of the present invention. The dynamic nature of the implementation generally allows for more efficient use of the external memory 108 by only enabling the integrity protection for data that the requester (or channel) requests be protected.

In one example, an interface implemented in accordance with a preferred embodiment of the present invention generally includes, but is not limited to, the following types of signals: an integrity protection control (or enable) signal (e.g., the signal ECC_ENABLE) that may be used to dynamically enable/disable integrity protection in accordance with the present invention; an uncorrectable error signal for each bit-group on a data bus (e.g., contained in the signal STATUS); a correctable error signal for each bit-group on the data bus (e.g., contained in the signal STATUS); an error count control signal (e.g., the signal INC_CORR_CNT) that may be configured to increment an optional error counter by one when asserted; a request signal (e.g., REQUEST) that may be used by a channel to request access to the external memory; write and read data acknowledgment signals (e.g., the signals W_DACK and R_DACK) that may be configured to indicate that the memory controller has accepted write data (W_DACK) or has valid read data (R_DACK); an arbiter acknowledgment signal (e.g., the signal ARBACK) that may be configured to indicate to a channel that a respective request is active. The signal W_DACK may be used to indicate when W_DATA_IN is being captured.

The present invention may be implemented with conventional memory devices. The present invention will generally work with any memory device that is a multiple of n bits (e.g., 2n). For example, the present invention may be implemented with, but is not limited to, DDR SDRAM memory implementations with widths of 8-, 16-, 32- or 64-bits. For any given memory device that is a multiple of n bits, one-half of the bits may be used for data and the other one-half may be used for the ECC or other integrity protection implemented. Depending upon the chosen form of error protection, a minimum number of bits may be implemented in order to get the desired protection.

In one example, n may be set equal to 8 to create bytes. For a write to the external memory 108, the present invention would calculate a byte of integrity protection information (e.g., ECC, parity, etc.) for every byte of data when the signal ECC_ENABLE is asserted. When integrity protection is enabled, the present invention may be configured to reorder the data such that the integrity protection data is interleaved with the protected data. For example, a unit of protected data may be written to the memory 108 in a first clock cycle and in a next clock cycle, the next memory location may be written with the integrity protection data for the unit of protected data written in the previous memory location. The present invention automatically handles the address calculations to interleave the integrity protection data with the protected data. In general, the present invention is transparent to the arbiter 104 and memory device 108.

In one example, a 32-bit interface may be implemented as illustrated in the following TABLE 3:

TABLE 3

| memory loc. 0 | memory loc. 1 | memory loc. 2 | memory loc. 3 |
| --- | --- | --- | --- |
| B3 B2 B1 B0 | E3 E2 E1 E0 | B7 B6 B5 B4 | E7 E6 E5 E4 | where B# represents a protected data byte and E# represents the integrity protection data byte (e.g., ECC, parity, etc.) for the protected data byte.

When reading data with ECC enabled, the data may be received from the external memory 108 as in the write example above. As the data from memory location 0 and 1 is received, the correction/detection checker 150 recalculates the protection data for each byte and compares the newly calculated protection data with the protection data retrieved from the external memory 108. If the recalculated protection data and the retrieved protection data do not match, the correction/detection checker 150 may attempt to recover the correct data using the integrity protection data. When recovery is possible, the correction/detection checker 150 may correct the data and present an indication of which byte(s) had a correctable error. When a correction is not possible, an unrecoverable error may be indicated on the appropriate byte(s).

After the correction/detection checker 150 is done with the data from memory locations 0 and 1, the recovered data B0-B3 may be stored together with integrity protection status flags in anticipation of the data from memory location 2. When the data from memory location 2 is received together with the integrity protection data from memory location 3, the correction/detection checker 150 repeats the procedure performed for locations 0 and 1. The result from the correction/detection checker 150 is not stored for location 2, but rather, the result may be concatenated (or merged) together with the previously stored results and transmitted, along with status information, to the requesting channel. Once the requesting channel receives the data and the status information from the correction/detection checker, the requesting channel may request the protocol controller 100 increase an error count if any errors occurred by asserting the signal INC_CORR_CNT.

The registers 154 and 156 implemented are generally sized to be large enough to hold one-half of the original data and 8 status bits for detected errors. The registers 154 and 156 may be re-used for other features when the integrity protection of the present invention is not active. The registers 154 and 156 may also be used to hold other information when the integrity protection mode is not active. For example, the registers 154 and 156 may hold data to be used in an XOR mode operation or for various test modes.

In the read path, a FIFO memory may be implemented to hold information about the use of the present invention. When the present invention is to be turned on (or enabled) for particular reads, the FIFO memory captures this fact and enables the integrity protection feature when the appropriate read data is received from the external memory. Information from the FIFO memory may also be used to generate the R_DACK signal that is transmitted to the requesting channel together with the regenerated data and the status information. For example, data owner information may be received with a channel request and stored in the FIFO memory. When the data for the request is ready to be sent to the channel, the data owner information may be retrieved from the FIFO memory and sent with the data.

While adding the protection to the data, the present invention also modifies the write or read address to the external memory as appropriate. Modification of the addresses is done such that the channel using the feature does not have to modify the address it is using to account for the fact that the physical memory consumption is twice that of a memory access with the integrity protection turned off. However, the channel is responsible for accounting for the additional memory consumption when memory space is allocated to protected data. The channels account for the additional memory used to prevent protected data from overwriting data belonging to another channel. In one example, each channel may provide the memory controller 102 with the physical address divided by two. After providing the physical address, the channel may increment the address by one as normal since the memory controller handles multiplying the address by two.

When writing or reading data with integrity protection enabled, the signal ARBACK and the signal W_DACK generally operate only every other clock cycle because one extra clock cycle is used to generate and write the correction/detection data. Similarly, for reads when integrity protection is enabled, one extra cycle is used to reassemble the read data and verify the protection.

A valuable feature of the design in addition to the present invention is the ability of a requesting channel to modify write data all the way up to the clock cycle when the requesting channel receives the first ARBACK. In order to preserve this feature when using the present invention, the write pipeline may be shortened by one stage when using the present invention.

Since the present invention is applied on an n-bit boundary, the present invention may be scaled to any 2n-bit boundary (e.g., n bits for data, n bits for the protection) by adding the appropriate number of error detection/correction generation and checking blocks. The present invention generally allows for cost reductions by only having as much logic as is used to protect the data in question. The present invention may also be used as part of an "end-to-end" data protection scheme. When an "end-to-end" data protection scheme is desired, data may be protected up to the point where the protection is added by the present invention. Data integrity may be checked after the protection has been added by the invention and if data integrity is verified, the data with the protection added by the present invention may be written to the external memory.

For any amount of data to be protected, an equal amount of space is used for the protection. When the integrity protection is enabled, the effective transfer rate of data is reduced by 50%. The present invention may be used to protect special tables and data that use relatively small amounts of buffer space. Examples of such tables may include, but are not limited to, defect tables, firmware code and additional code for internal sequencers.

Figure 3:
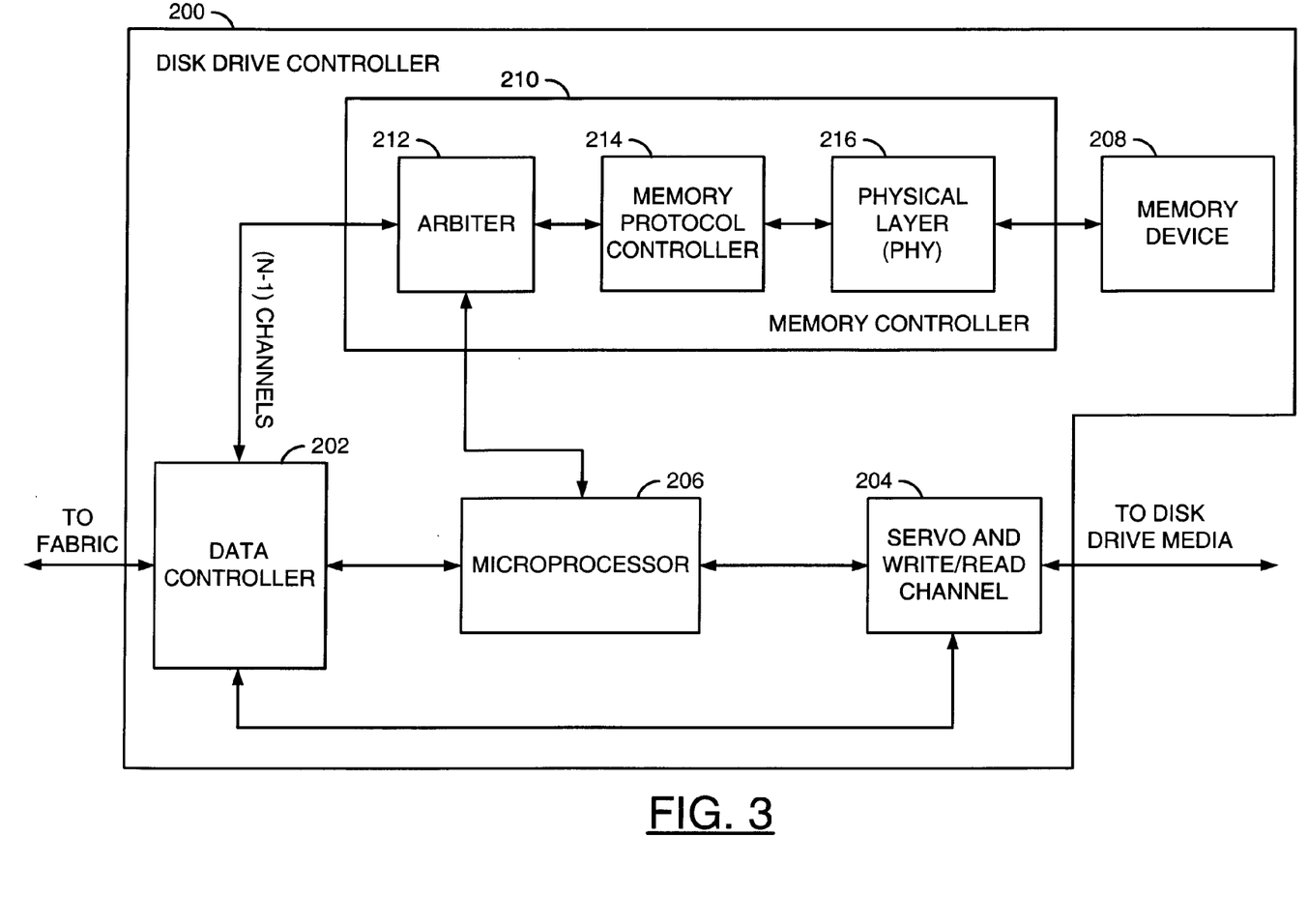
FIG. 3 is a block diagram illustrating a disk drive controller in accordance with the present invention.

Referring to FIG. 3, a block diagram is shown illustrating the present invention implemented in the context of a disk drive controller 200. The disk drive controller 200 may be divided into five parts: a data controller (or host) 202, a servo and write/read channel block 204, a microprocessor 206, a memory device 208 and a memory controller 210. The data controller (or host) 202 communicates with a fabric, the servo and write/read channel block 204, the microprocessor 206 and the memory controller 210. The servo and write/read channel block 204 writes data to and reads data from a disk and also properly maintains the write/read head position using the servo. The microprocessor 206 controls the overall operation of the disk drive controller 200. The memory controller 210 writes data to and reads data from the memory device 208.

The memory controller 210 generally comprises an arbiter 212, a memory protocol controller 214 and a physical layer 216. The arbiter 212, the memory protocol controller 214 and the physical layer 216 may be implemented similarly to the corresponding blocks 104, 100 and 106 described above in connection with FIGS. 1 and 2.

The data controller 202 may receive and present information to a fabric via a first input/output. A second input/output may connect the data controller 202 to the servo and write/read channel 204. A third input/output may connect the data controller 202 to the microprocessor 206. A fourth input/output may couple the data controller 202 to the memory controller 210. The servo and write/read channel 204 may have an input/output coupling the channel 204 with a disk drive media. The microprocessor 206 may have a second input/output that may couple the microprocessor 206 to the memory controller 210 and a third input/output that may couple the microprocessor 206 to the servo and write/read channel 204. The physical layer 216 may have an input/output that couples the memory controller 210 to the memory device 208.

The arbiter 212 may receive input and present output via the input/output connected to the data controller 202 and the input/output connected to the microprocessor 206. In one example, the arbiter 212 may support N channels. One channel may be assigned to the microprocessor 206 and (N−1) channels may be coupled to the data controller 202. The arbiter 212 may further have an input/output path connected to the memory protocol controller 214. The memory protocol controller 214 may have an input/output path connected to the physical layer 216. The physical layer 216 may be configured to link the memory controller 210 to the memory device 208.

FIG. 3 generally shows a high level block diagram of the parts of the disk drive controller 200 to illustrate an example of where the memory controller 210 implementing the present invention may be located. The data controller 202 may receive and transmit data on an external interface. The external interface may include, but is not limited to, Fiber Channel, SCSI, SAS, SATA or any other current or future interface protocol. The data controller 202 may provide numerous interfaces (or channels) to the memory controller 210. The microprocessor 206 may interact with the data controller 202, the memory controller 210 and the servo and Write/Read channel 204. The memory controller 210 may provide volatile storage to all the components within the disk drive controller 200. In general, the memory device 208 may reside both inside and outside of the disk drive controller 200. In a preferred embodiment, the memory device 208 may reside externally to the disk drive controller 200.

Figure 4:
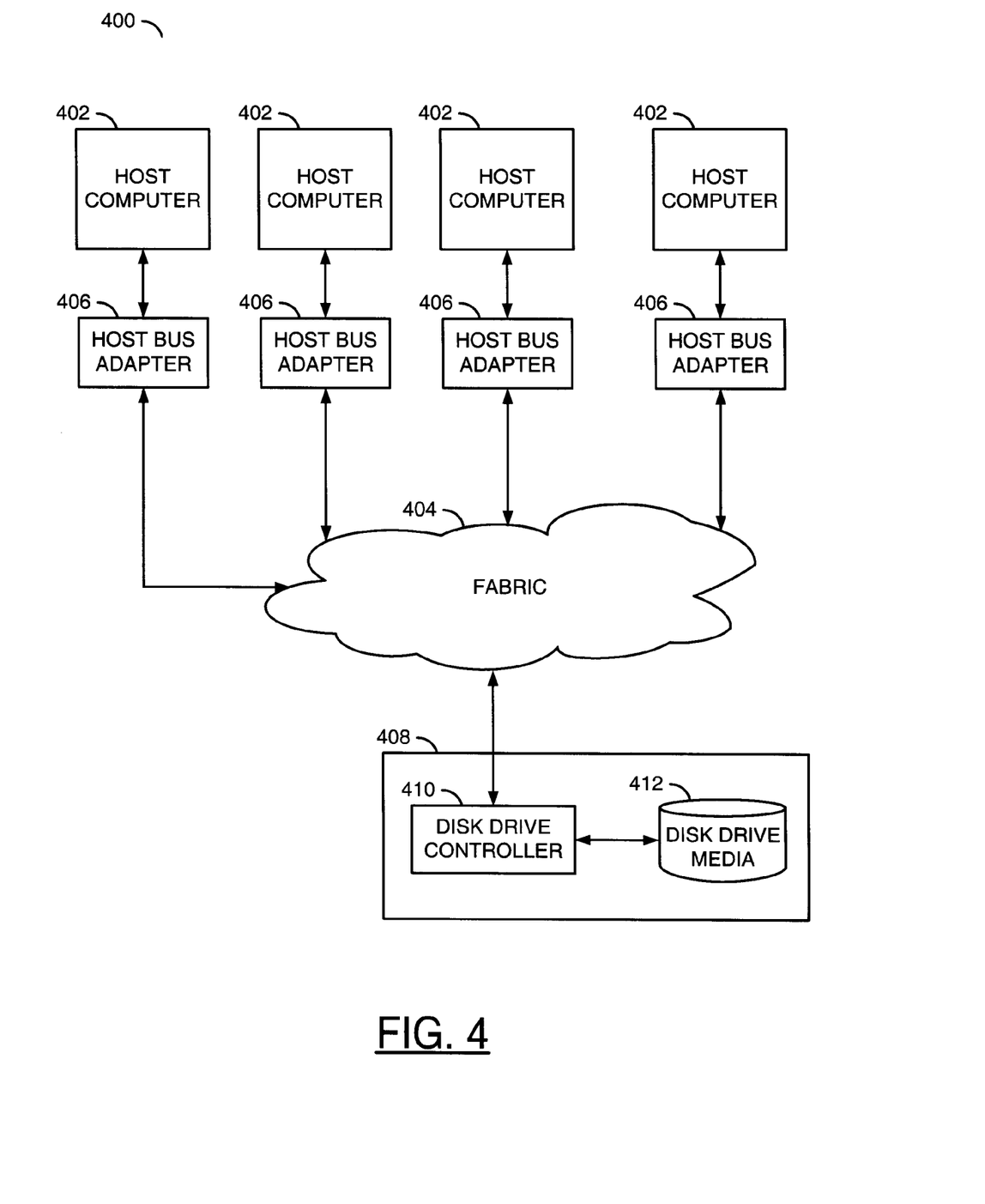
FIG. 4 is a block diagram illustrating a context for implementing the present invention.

Referring to FIG. 4, a system level diagram is shown illustrating an example context in which the presently described invention may be implemented. In one example, the present invention may be implemented in a disk drive controller implemented within a multi host computing environment 400. In one example, a number of host computers 402 may be connected to a fabric 404 through respective host bust adaptors (HBA) 406. The fabric 404 may be implemented using any kind of protocol that allows communication with a disk drive (e.g., Fiber Channel, SCSI, etc.). In another example, the fabric 404 may be connected to a disk drive (or an enclosure full of disk drives) 408. The disk drive 408 may physically consist of a disk drive controller 410 and a drive media (e.g., optical, magnetic, etc.) 412.

In one example, the present invention may be used in an enterprise disk drive. However, the present invention may be used in any setting where data integrity is desired. The low cost of the present invention makes the present invention ideal for any consumer product where data integrity is of concern. Different kinds of ECC may be employed. For example, any standard or proprietary byte-based protection scheme may be substituted for the ECC described above.

In general, the present invention may be used without significant modifications to the channels. In general, in order to take advantage of the present invention the channels are configured to provide the signal ECC_ENABLE (e.g., from a configuration bit) to activate/deactivate the integrity protection in accordance with the present invention. The channels may also be configured to qualify error flag bits and correction flag bits with whether the flag bits are valid to the particular operation. In a preferred embodiment, the flag bits may be generated at the byte level.

In one example, the channels may be configured so that when the flag bits are valid for the particular operation, the channel indicates an error or a correction based upon the flag bits. For example, when an error flag bit is set the channel may indicate that an error has been detected in the byte associated with the flag bit. When a correction flag bit is set the channel may indicate that a correction has been performed in the byte associated with the flag bit. In one example, the channel may be configured to increment a central correction counter by generating the signal INC_CORR_CNT in response to receiving an asserted correction flag bit. The central correction counter may be used for general status on the state of the memory device 108. The channels may be further configured such that when an error occurs the channel may generate an interrupt (or other signal) and optionally prevent the system from using the data with an error. Because the addresses used to access the memory are automatically multiplied by two in the controller of the present invention without the channels being aware, the channels may use the integrity protection provided by the present invention with minimal changes.

Figure 5:
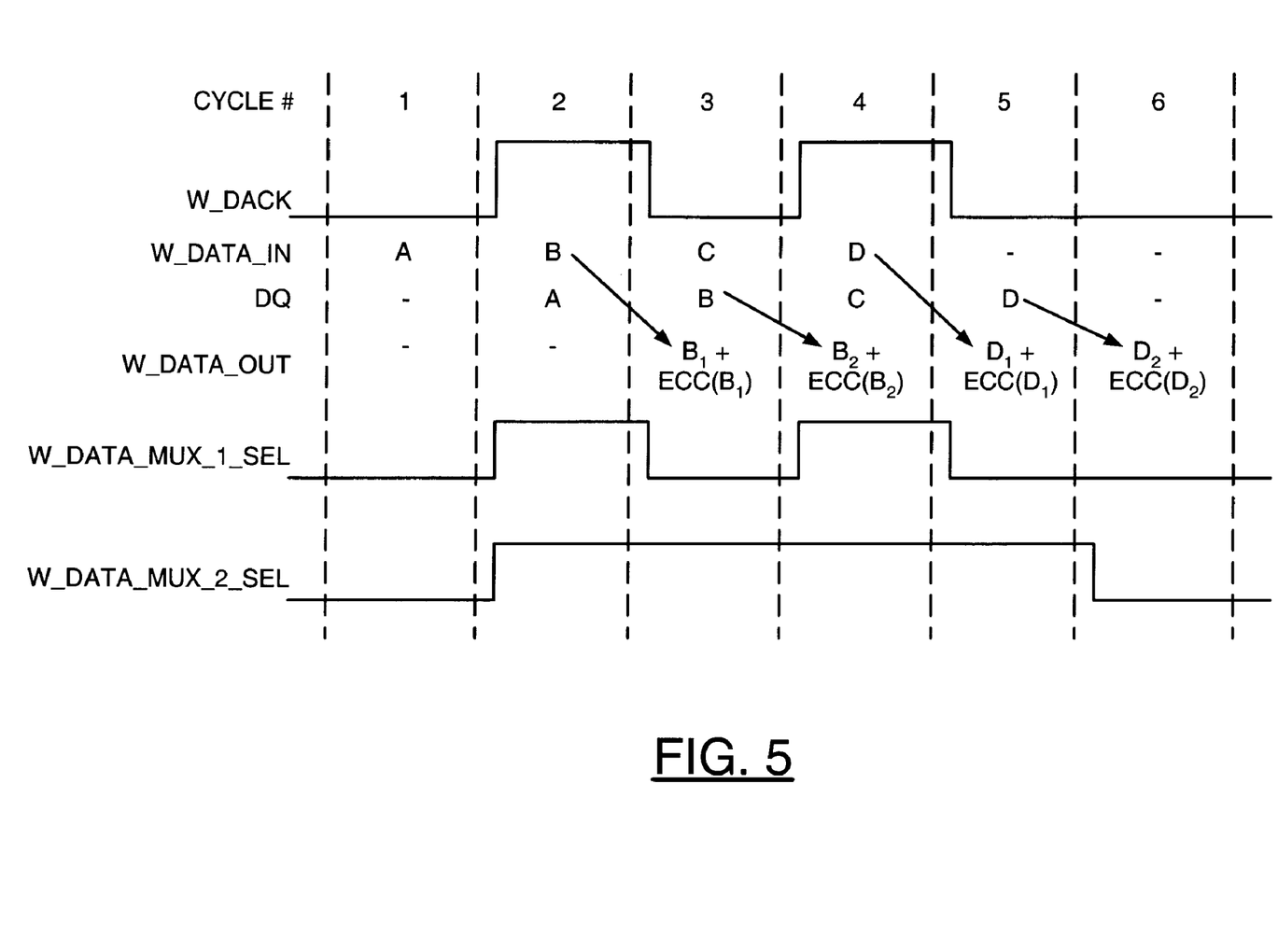
FIG. 5 is a timing diagram illustrating a data flow feature of the present invention.

Referring to FIG. 5, a timing diagram is shown illustrating an effect of changing data during assertion of the signal W_DACK. A feature of the present invention is the ability to allow a requester to change data during the assertion period of the signal W_DACK. In one example, the arbiter 104 may decide to grant access during a first cycle (e.g., cycle 1). During cycle 1, the data in the signal W_DATA_IN may be "A." However, the channel seeking to write using ECC may not be aware that access has been granted and may change (or modify) the data to "B" during cycle 2. If the write path had captured "A" at the same time access was granted, the wrong data would be captured. Instead, during cycle 2, the ECC is calculated on the first half of the data and at the end of cycle 2, the data (e.g., "B") is captured together with the ECC for the first half of the data. During cycle 3, the ECC is calculated for the second half of the data while the first half with ECC is transferred to the memory PHY 106 to be written to the memory 108. During cycle 4, the second half of "B" together with ECC is transferred to the PHY while the ECC is calculated on the first half of "D".

The data in the signal W_DATA_IN during cycles 1 and 3 (e.g., "A" and "C", respectively) may be ignored. The data "A" and "C" generally represent the initial data presented by the requestor. However, the requestor is allowed to modify the data in cycles 1-2 for "A" and cycles 3-4 for "C". In many cases, the data represented by B and D would be the same as represented by "A" and "C", respectively.

Figure 6:
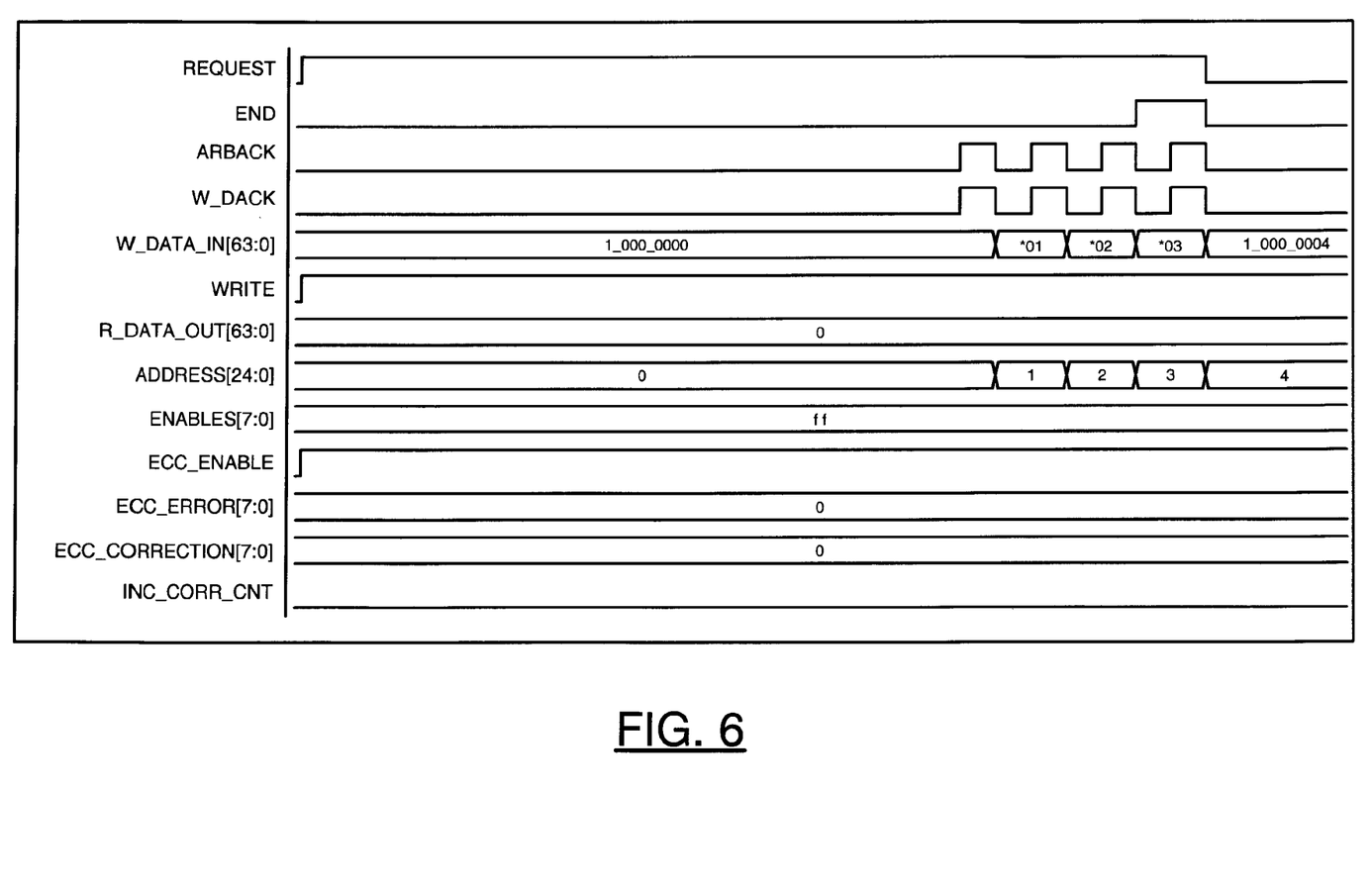
FIG. 6 is a timing diagram illustrating an example write operation.

Referring to FIG. 6, a timing diagram is shown illustrating various signals (e.g., REQUEST, END, ARBACK, W_DACK, W_DATA_IN, WRITE, R_DATA_OUT, ADDRESS, ENABLES, ECC_ENABLE, STATUS AND INC_CORR_CNT) of an example write operation performed using a memory controller in accordance with the present invention. In one example, the signal STATUS may comprise a first signal (e.g., ECC_ERROR[7:0]) and a second signal (e.g., ECC_CORRECTION[7:0]).

Figure 7:
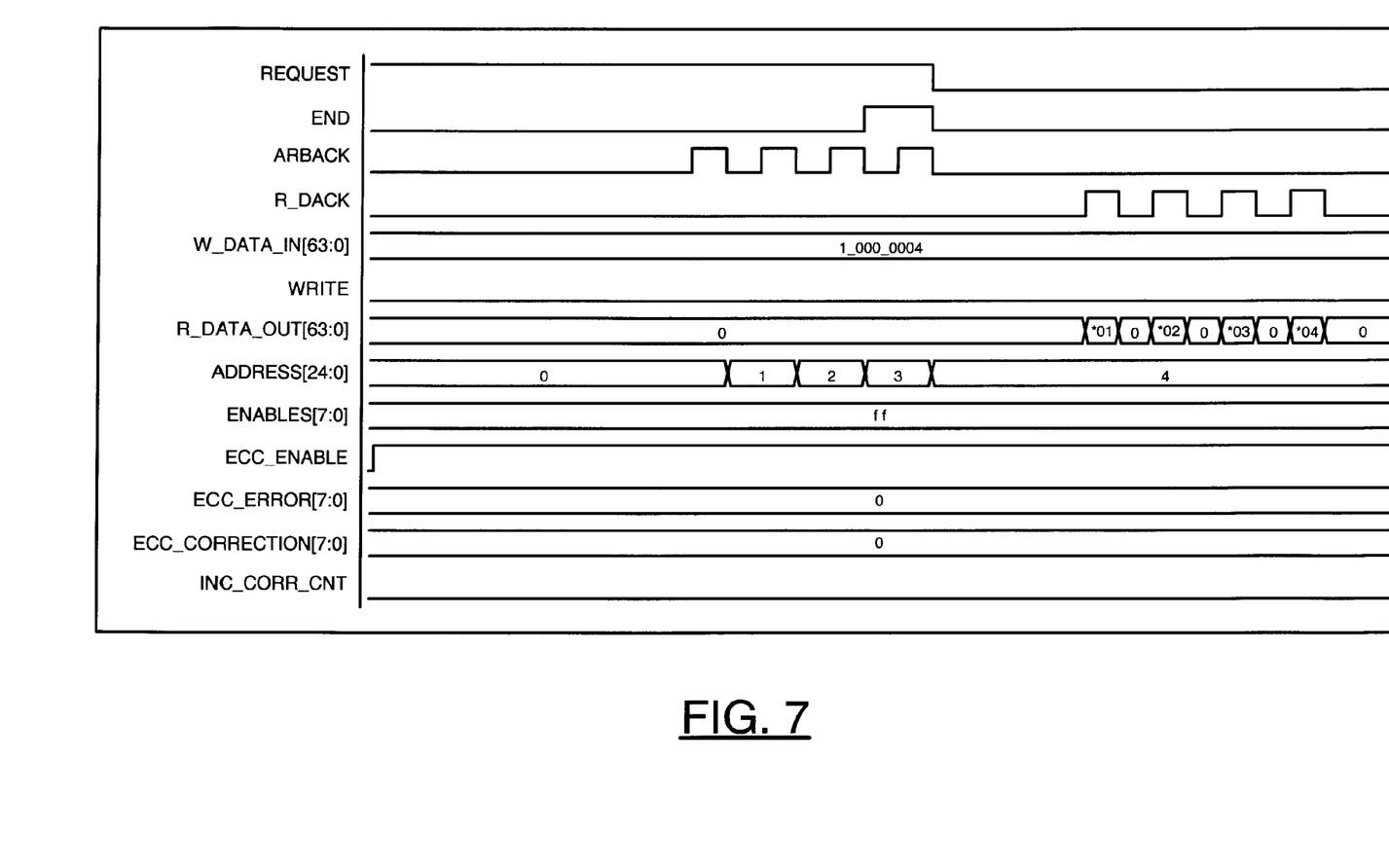
FIG. 7 is a timing diagram illustrating an example read operation.

Referring to FIG. 7, a timing diagram is shown illustrating various signals (e.g., REQUEST, END, ARBACK, R_DACK, W_DATA_IN, WRITE, R_DATA_OUT, ADDRESS, ENABLES, ECC_ENABLE, STATUS AND INC_CORR_CNT) of an example read operation performed using a memory controller in accordance with the present invention. In general, valid data is present when W_DACK and R_DACK are asserted. For reads, when the signal R_DACK is unasserted (e.g., LOW) the content of the signal R_DATA_OUT may be ignored. Since there is no valid data when R_DACK is unasserted, the signal R_DATA_OUT may retain the previous valid data (e.g., similar to the signal W_DATA_IN in FIG. 6) or may be set to zero (e.g., as shown in FIG. 7).

As used herein, the term "signal" is used generally to refer to information presented in any format including single bits, multiple bits, serially and/or in parallel. The various signals of the present invention are generally "on" (e.g., a digital HIGH, or 1) or "off" (e.g., a digital LOW, or 0). However, the particular polarities of the on (e.g., asserted) and off (e.g., deasserted) states of the signals may be adjusted (e.g., reversed) to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a control circuit configured to generate command signals, a read data path control signal, a read data valid signal, a signal indicating an owner of the read data, and one or more write data path control signals in response to an integrity protection control signal, a first input signal indicating read data is available from an external memory, a second input signal communicating data owner information, and one or more control signals, wherein said command signals include a first signal communicating commands to said external memory and an arbitration acknowledgment signal;
   a write data path circuit configured (i) to receive write data to be written to said external memory and (ii) to present the write data alone in a first mode and the write data followed by integrity protection data in a second mode, wherein said first and second modes are selected based upon said one or more write data path control signals;
   a read data path circuit configured to receive read data from said external memory, wherein (i) in said first mode said read data path circuit presents the read data received from the external memory and (ii) in said second mode said read data path circuit presents the read data after correction based upon integrity protection data also received from said external memory, wherein said first and second modes are selected based upon said read data path control signal; and
   an address generator circuit configured to generate one physical memory address in response to a logical address in said first mode and two physical addresses in response to said logical address in said second mode, wherein (i) in said first mode said write data is written and said read data is read without integrity protection, (ii) in said second mode said write data is written and said read data is read with integrity protection, (iii) said integrity protection data is written to a separate location from said write data and read from a separate location from said read data, and (iv) said address generator switches between said first and second modes based upon said integrity protection control signal.

2. The apparatus according to claim 1, wherein said first and said second modes are selected in response to a state of said integrity protection control signal.

3. The apparatus according to claim 1, wherein integrity protection is provided for a plurality of channels.

4. The apparatus according to claim 1, wherein a width of an interface to said external memory is the same regardless of whether said data is written with or without integrity protection.

5. The apparatus according to claim 4, wherein said external memory comprises a standard 2n-bit memory device.

6. The apparatus according to claim 1, wherein said control circuit comprises:
   a protocol state machine configured to generate said command signals in response to said integrity protection control signal and said one or more control signals;
   a read data flow control circuit configured to generate said read data path control signal, said read data valid signal, and said signal indicating an owner of the read data in response to an input signal indicating a command state of said protocol state machine, said first input signal indicating read data is available from said external memory, and said second input signal communicating data owner information; and
   a write data flow control circuit configured to generate said one or more write data path control signals in response to said integrity protection control signal.

7. The apparatus according to claim 1, wherein said write data path allows said write data to be modified while an acknowledgment signal is asserted.

8. The apparatus according to claim 1, further comprising an error correction counter configured to increment an error count in response to an input signal received from a channel indicating the count should be incremented.

9. The apparatus according to claim 1, wherein said integrity protection data is selected from the group consisting of error correction codes (ECC) and parity.

10. The apparatus according to claim 1, wherein:
said write data path comprises an error detection generator; and
said read data path comprises an error detection checker.

11. The apparatus according to claim 1, wherein:
said write data path comprises an error correction/detection generator; and
said read data path comprises an error correction/detection checker.

12. The apparatus according to claim 1, further comprising:
an arbiter configured to couple a plurality of channels to said control circuit, said write data path circuit, said read data path circuit and said address generator circuit;
a physical layer controller configured to couple said external memory to said control circuit, said write data path circuit, said read data path circuit and said address generator circuit.

13. The apparatus according to claim 12, wherein said apparatus is part of a memory controller.

14. The apparatus according to claim 13, wherein said memory controller is part of a disk drive controller.

15. The apparatus according to claim 1, wherein said control circuit, said write data path circuit, said read data path circuit and said address generator circuit are part of a protocol controller.

16. An apparatus comprising:
means for generating command signals in response to an integrity protection control signal and one or more control signals, wherein said command signals include a first signal communicating commands to an external memory and an arbitration acknowledgment signal;
means for generating a read data path control signal, a read data valid signal, and a signal indicating an owner of the read data in response to a first input signal indicating a command state of said command signals generating means, a second input signal indicating read data is available from said external memory, and a third input signal communicating data owner information;
means for generating one or more write data path control signals in response to said integrity protection control signal;
means for receiving write data to be written to said external memory and presenting the write data alone in a first mode and the write data followed by integrity protection data in a second mode, wherein said first and second modes are selected based upon said one or more write data path control signals;
means for receiving read data from said external memory, wherein (i) in said first mode said means for receiving read data presents the read data received from the external memory and (ii) in said second mode said means for receiving read data presents the read data that has been corrected based upon integrity protection data also received from said external memory, wherein said first and second modes are selected based upon said read data path control signal; and
means for generating addresses configured to generate one physical memory address in response to a logical address in said first mode and two physical addresses in response to said logical address in said second mode, wherein (i) in said first mode said write data is written and said read data is read without integrity protection, (ii) in said second mode said write data is written and said read data is read with integrity protection, (iii) said integrity protection data is written to a separate location from said write data and read from a separate location from said read data, and (iv) said means for generating addresses switches between said first and second modes based upon said integrity protection control signal.

17. A method for sharing integrity protection among a plurality of channels, comprising the steps of:
generating command signals in response to an integrity protection control signal and one or more control signals, wherein said command signals include a first signal communicating commands to an external memory and an arbitration acknowledgment signal;
generating a read data path control signal a read data valid signal, and a signal indicating an owner of the read data in response to a first input signal indicating a command state of said command signals generating means, a second input signal indicating read data is available from said external memory, and a third input signal communicating data owner information;
generating one or more write data path control signals in response to said integrity protection control signal;
receiving write data to be written to said external memory and presenting the write data alone in a first mode and the write data followed by integrity protection data in a second mode, wherein said first and second modes are selected based upon said one or more write data path control signals; and
receiving read data from said external memory and presenting (i) said read data as received in said first mode and (ii) said read data after correction based upon integrity protection data also received from said external memory in said second mode, wherein said first and second modes are selected based upon said read data path control signal; and
generating one physical memory address in response to a logical address in said first mode and two physical addresses in response to said logical address in said second mode, wherein (i) in said first mode said write data is written and said read data is read without integrity protection, and (ii) in said second mode said write data is written and said read data is read with integrity protection, (iii) said integrity protection data is written to a separate location from said write data and read from a separate location from said read data, and (iv) switching between said first and second modes is based upon said integrity protection control signal.

18. The method according to claim 17, further comprising allowing data to be written to said memory to be modified by a requestor while an acknowledgment signal is asserted.

19. The method according to claim 17, wherein integrity protection for said plurality of channels is implemented with minimum changes to each channel.

20. The apparatus according to claim 12, further comprising:
a data controller coupled to said arbiter and a network fabric;
a processor coupled to said arbiter and said data controller; and
a servo and write/read channel coupled to said processor and said data controller, said servo and write/read channel configured to write data to and read data from a disk drive media and maintain a write/read head position.

* * * * *